US 6,484,041 B1

(12) United States Patent
Aho et al.

(10) Patent No.: US 6,484,041 B1
(45) Date of Patent: Nov. 19, 2002

(54) METHOD FOR ADJUSTING POWER CONSUMPTION

(75) Inventors: Ari Aho, Tampere (FI); Markku Lipponen, Tampere (FI); Jarno Knuutila, Tampere (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/413,297

(22) Filed: Oct. 6, 1999

(30) Foreign Application Priority Data

Oct. 7, 1998 (FI) .................................................. 982183

(51) Int. Cl.[7] .............................. H04B 1/38; H04M 1/00
(52) U.S. Cl. ...................... 455/574; 455/127; 455/572; 455/343
(58) Field of Search ................................ 455/557, 556, 455/555, 550, 572, 574, 343, 466, 426, 418, 127, 248.1, 126, 114, 115, 69, 251.1; 370/311

(56) References Cited

U.S. PATENT DOCUMENTS

| | | | |
|---|---|---|---|
| 5,021,679 A | | 6/1991 | Fairbanks et al. ............. 307/66 |
| 5,218,704 A | | 6/1993 | Watts, Jr. et al. ............ 395/750 |
| 5,327,583 A | * | 7/1994 | Yamada et al. .............. 455/572 |
| 5,745,774 A | | 4/1998 | Munetsugu ............. 395/750.04 |
| 5,760,636 A | | 6/1998 | Noble et al. .................. 327/513 |
| 5,903,849 A | * | 5/1999 | Selin et al. ................... 455/557 |
| 6,275,715 B1 | * | 8/2001 | Motohashi et al. .......... 455/574 |
| 6,301,488 B1 | * | 10/2001 | Alos et al. ................... 455/557 |

OTHER PUBLICATIONS

Finnish Office Action.

* cited by examiner

*Primary Examiner*—Vivian Chin
*Assistant Examiner*—John J Lee
(74) *Attorney, Agent, or Firm*—Perman & Green, LLP

(57) ABSTRACT

In a method for adjusting the power consumption of a communication device (1), at least a first operating voltage ($V_{CC1}$, $V_{CC2}$) is generated for the communication device (1), and the communication device (1) contains at least one processor (MPU, DSP) which is used to execute program commands of one or more applications. The execution rate of at least one processor (MPU, DSP) in the communication device is set with a clock signal (CLK) which is generated by a device (17) for generating a clock signal (CLK). The operating voltage for the device (17) for generating a clock signal (CLK) is provided by a second operating voltage ($V_{CC2}$). A performance requirement is specified for the applications, wherein at least the first operating voltage ($V_{CC1}$) of the communication device (1) is adjusted on the basis of the performance requirement of one or more applications which are being executed at a given time.

17 Claims, 2 Drawing Sheets

METHOD FOR ADJUSTING POWER CONSUMPTION

BACKGROUND OF THE INVENTION

1. Field of the Invention

The present invention relates to a method for adjusting the power consumption of an communication device, in which method at least one operating voltage is generated for the communication device containing at least one processor which is used to execute program commands of one or more applications. The invention also relates to a communication device whose power consumption is arranged to be controlled.

2. Description of Prior Developments

The features in wireless communication devices, such as mobile phones, are constantly increasing, and they typically include functions for storing e.g. telephone numbers of people and firms. As is well known, there are also devices available which contain two different user interfaces, for example the user interfaces of a wireless communication device and a PDA device. One such device is the Nokia 9000 Communicator. In this specification, the term communication device will be used for such a device. By means of the PDA user interface of such a communication device, it is possible to store various data in the device, to have a wireless connection to the Internet network, and to receive for example telecopy messages, and by means of the CMT user interface (Cellular Mobile Telephone) of the same it is possible to perform conventional mobile phone functions such as receiving a call and selecting a telephone number. The above-described communication device typically comprises separate keypads and displays for the different user interfaces.

For storing various information, there are known devices available, such as notebook microcomputers, small handheld computers, or PDA devices (Personal Digital Assistant). In this specification, PDA devices refer to devices similar to the ones described above. In these devices, it is possible to store for example calendar data, notes, address data, telephone numbers or corresponding information entered by the user. This information can be reviewed by means of the display of the device. The data is typically entered in these devices by means of a keypad, but it is known that there are also devices available which are equipped with a touch screen so that the functions of the device can be controlled by touch. The performance of the PDA devices is constantly enhanced, and they already contain many features known from PC devices (Personal Computer).

In this specification, the aforementioned different functions will be called applications (calendar application, notebook application, video call application, etc). Correspondingly, in this specification, the aforementioned notebook microcomputers, PDA devices, wireless communication devices among which also a communication device can be classified, etc, will be called electronic devices. The applications are composed of program commands executed by one or more processors of the electronic device. Furthermore, the applications are typically supplemented with data sections, such as different set parameters. The execution of the applications is advantageously controlled by means of a so-called operating system. The operating system is composed of the program commands of the processor as well. The operating system is used to provide the applications under execution with execution time, and to control information transmission between the application and the functional parts of the communication device, for example reading the keypad and writing out on the display device. In this specification, the performance requirement of the application refers particularly to the rate in which the application executes program commands, i.e. its processing capacity. Other factors that affect the performance of the application can include for example the memory capacity required in the performance of the application.

Different applications used in connection with such an electronic device often have different performance requirements. For example, a video call conducted with a communication device requires a considerably greater capacity than the use of a calendar application. The video call can be implemented in such a way that a data call of two time slots is set up in the communication device, which for example in the GSM mobile communication network with channel coding of 14.4 kbit/s means a data transmission rate of 28.8 kbit/s. Furthermore, the communication device has to be capable of executing a video conference system application when necessary. A conventional audio call does not require as great a performance as the video call but, however, a greater performance than the calendar application. There are also known wireless telephones in which applications with different performance requirements are available, such as games, a calendar and a speech call.

In practical applications, for example in a communication device, one or more processors, part of the digital logics and a large part of the memory are integrated together in a single application specific integrated circuit (ASIC). The power consumption of such an ASIC circuit can be described by means of the following simplified model:

$$P = V^2 \cdot C \cdot F \qquad (1)$$

in which

V=operating voltage,
C=capacitance,
F=clock frequency,

The capacitance of the internal couplings in the ASIC circuit is determined according to the technology used in the implementation of the ASIC circuit, and this capacitance cannot be influenced during the use of the communication device. In a communication device of prior art, the operating voltage and the clock frequency of the ASIC circuit are set in such a way at the designing stage that the application requiring the highest performance will function sufficiently fast. This has the result that the use of applications requiring less performance will also consume as much power as the use of an application requiring great performance. The operating voltage and the clock frequency are connected with each other in such a way that a high clock frequency requires the use of a higher operating voltage than lower clock frequency. On the basis of the aforementioned formula, the power consumption increases as a square of the operating voltage, and thus enhancing the performance by increasing the clock frequency and, respectively, the operating voltage, considerably increases the power consumption of the ASIC circuit.

The performance requirement of the application can usually be estimated at the stage of designing the application. The use of the application can affect the performance required. For example real-time applications, such as calls of different types and the transmission of video information, require that certain operations are performed within set time limits. However, non-real-time applications, such as reading and writing a calendar, a notebook, or e-mails of a communication device, are not critical in view of the time of execution, but during the use of such applications, the processor of the communication device is waiting for the actions of the user for the most of the time.

Solutions have been developed in which at least part of the function of the ASIC circuit can be set in a so-called standby condition or inactive state when there are no applications to be executed. With this solution, it is possible to reduce the power consumption of the communication device at least to a certain extent, but the power consumption is substantially increased into the maximum when the user starts up an application, such as a calendar application or a notebook application.

In some mobile communication systems, such as GSM, the wireless communication devices must use only one reference oscillator from which all necessary frequences are generated. Therefore, in prior art communication devices it has not been possible to change the clock frequency of the processors to adjust the power consumption of the communication device.

SUMMARY OF THE INVENTION

The purpose of the present invention is to provide a method for adjusting the power consumption of a communication device dynamically on the basis of the performance requirements of the applications used in the communication device at a given time, as well as a communication device in which it is possible to adjust power consumption dynamically. The invention is based on the idea that in the communication device, the operating voltage and the clock frequency are adjusted simultaneously on the basis of the performance required by the application used at a given time. The method according to the present invention is a method for adjusting the power consumption of a communication device, in which method at least a first operating voltage ($V_{CC1}$, $V_{CC2}$) is generated for the communication device, the communication device contains at least one processor (MPU, DSP) which is used to execute program commands of one or more applications, the execution rate of at least one processor (MPU, DSP) in the communication device is set with a clock signal (CLK) which is generated by means for generating a clock signal (CLK), and the operating voltage for the means for generating a clock signal (CLK) that is provided by a second operating voltage ($V_{CC2}$), characterized in that a performance requirement is specified for the applications, wherein at least the first operating voltage ($V_{CC1}$) of the communication device is adjusted on the basis of the performance requirement of one or more applications which are being executed at a time, and that the second operating voltage ($V_{CC2}$) is kept substantially constant during the change of at least the first operating voltage ($V_{CC1}$). Whereas the communication device according to the present invention comprises means for generating a first operating voltage ($V_{CC1}$), one or more processors (MPU, DSP) for executing the program commands of applications, means for generating a clock signal (CLK) for the processor, and means for generating a second operating voltage ($V_{CC2}$) for the means for generating a clock signal (CLK), characterized in that a performance requirement is specified for the applications, that the communication device also comprises means (MPU, DSP) for examining the performance requirement of the application and means (CTRL, 22) for adjusting at least the first operating voltage ($V_{CC1}$), wherein the first operating voltage ($V_{CC1}$) is arranged to be adjusted on the basis of the performance requirement of one or more applications under execution at a given time, and that the second operating voltage ($V_{CC2}$) is arranged to be kept substantially constant during the change of at least the first operating voltage ($V_{CC1}$).

With the present invention, considerable advantages are achieved when compared with solutions of prior art. With the method according to the invention, it is possible to considerably reduce the power consumption of a communication device in comparison with communication devices of prior art, especially when using applications which require less performance. Reducing the power consumption does not, however, affect the functionality of the applications in the communication device. In addition to the increased operating time of the communication device, the smaller power consumption also entails the advantage that the generation of heat in the communication device is smaller than in communication devices of prior art. This reduces the failure probability. The life of the battery is also extended because the need to charge the battery is decreased with the smaller power consumption. With the method according to the invention, it is also possible to keep the processors in operation during the change of operating voltages. With the present invention it is possible to change the operating voltages in a very large scale and it is also possible to set the operating voltages into many different values. Further, the change of the operating voltages is preferably conducted by software of a processor of the communication device. In the communication device according to the invention there are means for generating an adjustable clock signal from one oscillator. Further, it is possible to adjust the operating voltages and clock signal frequencies almost independently from each other and to use many different voltage-frequency combinations in the communication device according to the invention.

BRIEF DESCRIPTION OF THE DRAWINGS

In the following, the invention will be described in more detail with reference to the appended drawings, in which.

DESCRIPTION OF THE PREFERRED EMBODIMENTS

Figure 1:
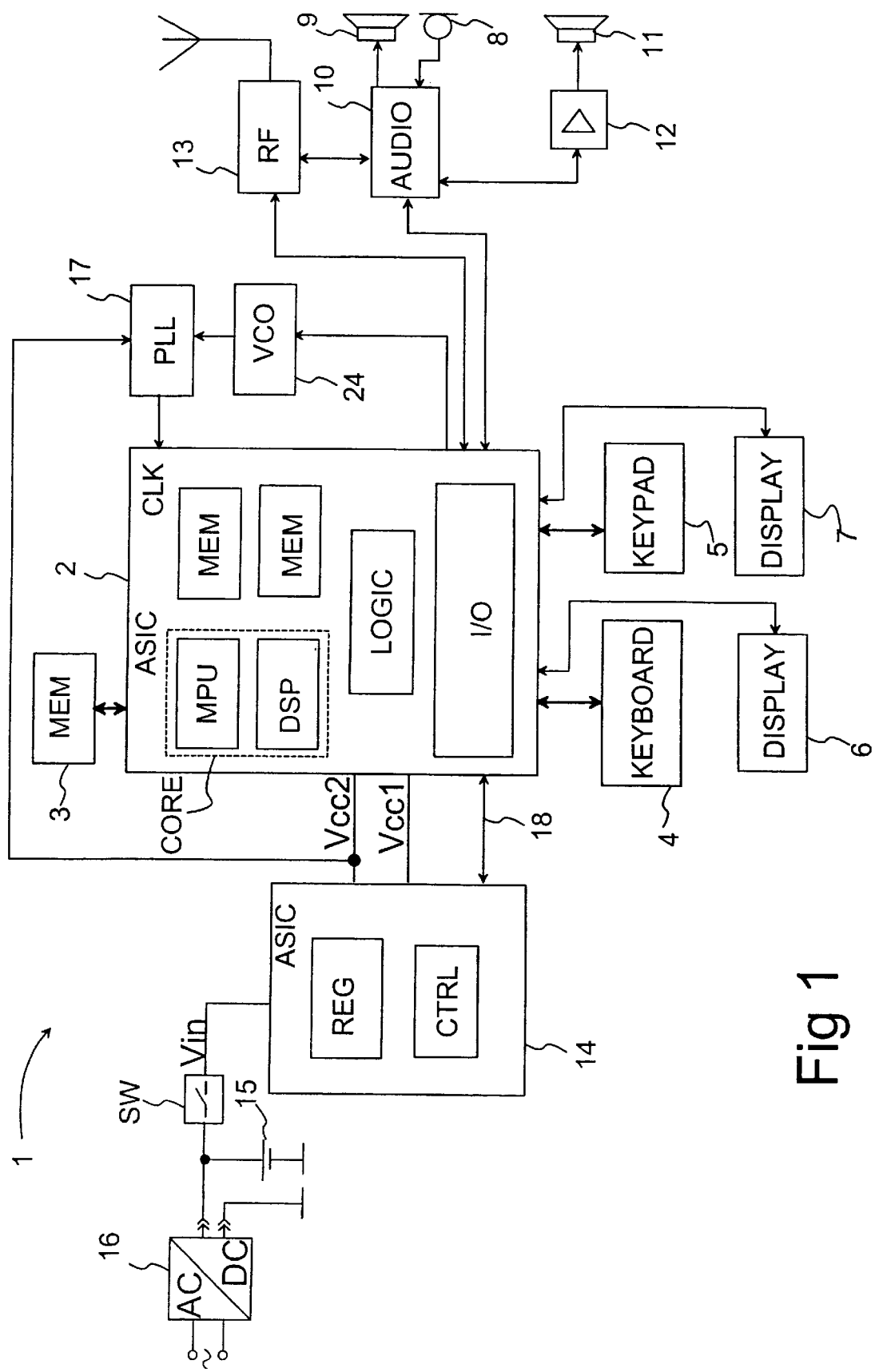
FIG. 1 shows a communication device according to a preferred embodiment of the invention in a reduced block diagram.

FIG. 1 is a reduced block diagram illustrating a communication device 1 according to a preferred embodiment of the invention, in this example a communication device which comprises data processing functions and mobile station functions. It is obvious that the invention can also be applied in other wireless communication devices, such as mobile phones. Furthermore, the invention can also be applied in other communication devices which contain components whose operating voltage is adjustable. Advantageously, the invention can be applied in portable communication devices, in which the power source is a battery.

Most of the functions of the communication device 1 are implemented in a first ASIC circuit 2. This first ASIC circuit 2 comprises, for instance, a first processor MPU which is advantageously a universally applicable so-called RISC processor, i.e. a reduced instruction set computer. Furthermore, the first ASIC circuit comprises a second processor DSP, i.e. a digital signal processor, in which signal processing functions are typically implemented.

Furthermore, the first ASIC circuit 2 comprises memory means MEM which can be partly shared by the first processor MPU and the second processor DSP, logic couplings LOGIC and an interface I/O. The couplings between these different blocks of the ASIC circuit are not shown in FIG. 1, because they are prior art known as such by anyone skilled in the art, and have no significance in view of understanding this invention. Furthermore, in the electronic device 1, the internal memory means of the first ASIC circuit 2 can be replaced by or supplemented with external memory means 3.

The first ASIC circuit 2 is provided with a first keyboard 4, which in this preferred embodiment is a keyboard used primarily in connection with data processing functions, advantageously a so-called QWERTY keyboard. This first ASIC circuit also includes a second keyboard 5, used primarily for mobile station functions. Furthermore, in this embodiment, the electronic device 1 comprises two display devices 6, 7, of which the first display device 6 is used primarily in connection with data processing functions, and the second display device 7 is used primarily in connection with mobile station functions. It is obvious that when necessary, said first keyboard 4 and second keyboard 5 and first display device 6 and second display device 7 can be used in connection with both mobile station functions and data processing functions. A microphone 8 and a receiver 9 are coupled to the first ASIC circuit 2 via an audio block 10. This audio block 10 contains a codec by means of which, for example during an audio call, a microphone signal is converted to a digital signal and a digital speech signal is converted to an analog signal to be transmitted to the receiver 9. Furthermore, the electronic device 1 comprises advantageously a speaker 11 to which the audio signal is advantageously transmitted via an audio amplifier 12. The speaker 11 is used primarily in cases when the electronic device 1 is e.g. placed on a table in a position which enables using data processing functions. Thus, sounds are transmitted advantageously also from mobile station functions to this speaker 11.

The electronic device 1 in FIG. 1 also comprises a high frequency part 13 (RF, Radio Frequency), by means of which calls are transmitted between the electronic device 1 and the mobile communication network in a way known as such.

Figure 2:
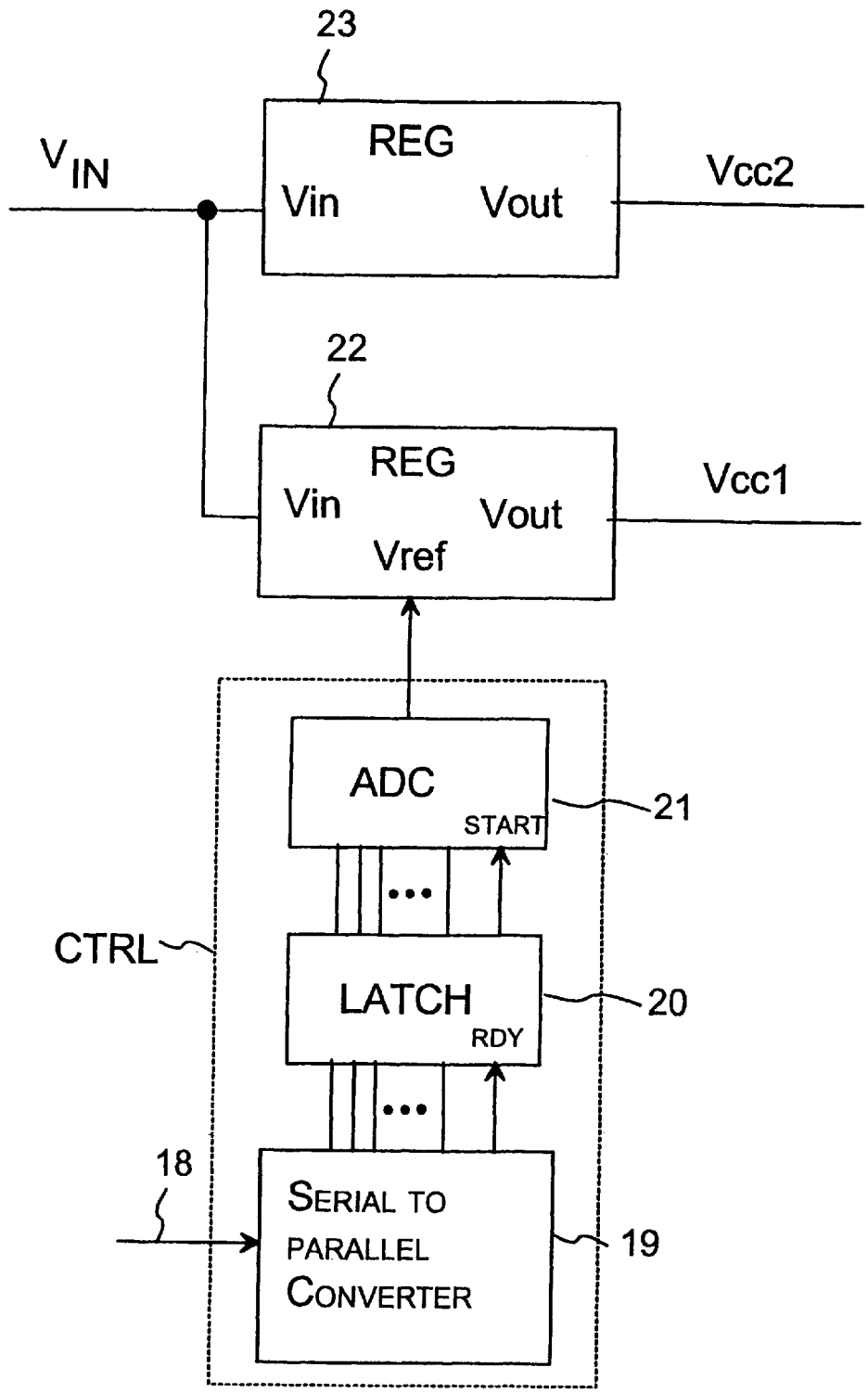
FIG. 2 is a skeleton diagram illustrating the control of the operating voltage according to a preferred embodiment of the invention in a skeleton diagram.

The electronic device 1 also comprises a power supply circuit 14, which in this embodiment is also implemented as an ASIC circuit. This power supply circuit 14 comprises means for generating operating voltages $V_{CC1}$, $V_{CC2}$ from a supply voltage $V_{IN}$. The function of means REG for generating the voltage is controlled with a control block CTRL, which comprises for example a so-called control register 20 (FIG. 2). The supply voltage $V_{IN}$ is advantageously generated with a battery 15, which is charged with a charging device 16 when necessary.

In the following, the function of a method according to a preferred embodiment of the invention will be described in this electronic device 1 according to FIG. 1. In this embodiment, the first operating voltage $V_{CC1}$ is arranged to be controlled within the range of certain minimum and maximum values, which are determined on the basis of the technology used in the application in question. The minimum of the first operating voltage is marked with $V_{min}$ and the maximum with $V_{max}$. Thus, when coupling the supply voltage to the electronic device 1 with a switch SW, the block REG for generating the voltage in the power supply circuit 14 sets the first operating voltage VCC1 to an initial voltage rating which is between the minimum $V_{min}$ and the maximum $V_{max}$, for example close to the mean of these ratings. As was presented above in connection with Formula 1, the operating voltage and the clock frequency are linked to each other, and therefore the frequency of the clock signal in the first ASIC circuit 2 has to be set according to the initial rating of this first operating voltage $V_{CC1}$ so that the internal blocks of the first ASIC circuit 2 are operating. For the first ASIC circuit 2, the clock signal is transmitted to a pin CLK. The clock signal is generated for example with a phase locked loop 17 (PLL).

Correspondingly, the second operating voltage $V_{CC2}$ is set to a certain operating voltage rating, for example 1.8 V. In this embodiment, it is assumed that this second operating voltage $V_{CC2}$ is constant and intended for instance for supplying voltages of the I/O interfaces of the first ASIC circuit. This constant second operating voltage $V_{CC2}$ is necessary in applications in which the external blocks of the first ASIC circuit 2 require a constant operating voltage to be able to function. It is obvious that there can be several operating voltages different from the second operating voltage $V_{CC2}$ presented in this example.

The second operating voltage $V_{CC2}$ is also intended for supplying the operating voltage of the phase locked loop 17. It is necessary to use a constant operating voltage for the phase locked loop 17 during the change of frequency of the phase locked loop 17. Otherwise the operation of the phase locked loop 17 could be hampered and the output signal of the phase locked loop 17 would be unstable. Due to possible differences between the operating voltages of the phase locked loop 17 and the first ASIC circuit 2 it is necessary to have means to change the level of the clock signal of the phase locked loop 17. Such means are e.g. a level shifter 25 which is connected between the output of the phase locked loop 17 and the clock input CLK of the first ASIC circuit 2.

It is also possible that the phase locked loop 17 is implemented in the first ASIC circuit 2. In such an embodiment the operating voltage for the phase locked loop 17 is provided from a different operating voltage source than the first operating voltage $V_{CC1}$ so that the operating voltage for the phase locked loop 17 can be kept fixed during the change of the first operating voltage $V_{CC1}$. Also the level shifter 25 is advantageously implemented inside the first ASIC circuit 2.

The first operating voltage $V_{CC1}$ is intended for the supply of the operating voltage of the processors MPU, DSP, i.e. so-called core, of the first ASIC circuit. On the other hand, this first operating voltage $V_{CC1}$ can also be used to supply the operating voltages of the memory means MEM of the first ASIC circuit 2 and the logic couplings LOGIC, provided that they are functioning within the entire control range of the first operating voltage $V_{CC1}$. It is obvious that when solutions that enable a wide operating voltage range are used outside the first ASIC circuit 2 as well, the control of the operating voltage can also be implemented for these components located outside the first ASIC circuit 2.

After turning on the operating voltages with the initial voltage rating, e.g. 1.5 V, set for the first operating voltage $V_{CC1}$, it is possible to advantageously use applications requiring less performance and a low clock frequency, for example below 100 MHz for the first processor MPU and for the second processor DSP. It is obvious that the voltage and frequency ratings presented in this specification are only illustrative, not restrictive examples. The information on the voltage rating set in the first operating voltage line $V_{CC1}$ can also be transmitted to the first processor MPU. This can be done for example in such a way that the first processor MPU reads the rating in the control register of the power supply circuit 14. This reading procedure can be advantageously implemented via a voltage control bus 18, which is advantageously a serial bus, but a parallel bus is also feasible. In practical applications, the operating voltage ratings for the start-up are known by the software of the first processor MPU, wherein it is not necessary to read said control register and the first processor MPU controls the change of the operating voltages.

It the user wants to activate an application which requires the performance of a higher operating voltage and clock frequency, a rating is set in the control register of the operating voltage, which rating is used to set the first operating voltage $V_{CC1}$ into a new, higher rating. Such an application is for example a video call. The software of the processor MPU, DSP can also detect a need to change the operating voltage, for example in the case of an incoming call. After terminating an application requiring higher performance, the first operating voltage is advantageously set in a rating with which the application of the running applications which requires the highest performance functions in a sufficiently efficient way. If there are no active applications, the first operating voltage $V_{CC1}$ is advantageously set into the lowest rating permitted, for example into 1.0 V.

FIG. 2 presents a preferred structure of the power supply circuit 14 in. a reduced block diagram. In this preferred embodiment, the control of the first operating voltage $V_{CC1}$ is implemented in the following way. When the first processor MPU detects or is informed of a need to change the operating voltage, the first processsor MPU writes a rating for the control bus 18 of the operating voltage, which rating corresponds to the desired new operating voltage rating. This rating, which is transferred in a series mode via the control bus 18 to the power supply circuit, is converted with a serial to parallel converter 19 to a parallel mode and transferred to the control register 20. When the operating voltage information transmitted from the serial bus is converted to the parallel mode, the serial to parallel converter 19 generates advantageously a trigger signal RDY, by means of which the rating in the output of the serial to parallel converter 19 is transferred to the control register 20, which is e.g. a register composed of so-called D-type flip-flop circuits, but it is also possible to use other solutions known as such. On the basis of this rating written in the control register 20, a reference voltage is generated in a digital/analog converter 21 and supplied to a reference voltage input $V_{ref}$ in a first voltage regulator 22. The conversion of the digital/analog converter 21 is advantageously started up with a signal which is to be conducted into a starting line START and is for example a short-duration impulse, which is known as such. It is obvious for anyone skilled in the art that the reference voltage can also be generated in another way, for example with a resistor divider and switches (not shown), which are used to select the reference voltage rating desired at a given time.

The first voltage regulator 22 is supplied with a supply voltage, for example from the battery 15 to an input voltage pin $V_{in}$. The first voltage regulator 22 generates in an output voltage line $V_{out}$ an output voltage corresponding to the reference voltage. However, the voltage of the output voltage line $V_{out}$ does not change immediately after it has been written in the control register 20, but it takes some time to alter the voltage. This conversion time depends, for example, on the extent of the change and on the implementation of the power supply circuit 14 used at a given time. To monitor this conversion time, the first processor MPU starts up for example a timer (not shown) at the moment of programming a new voltage value. When the timer indicates that the set time has expired, the first processor MPU knows that the first operating voltage $V_{CC1}$ is set correctly. It is obvious that when necessary, it is possible to use an analog/digital converter to detect the voltage rating of the first operating voltage $V_{CC1}$, but this increases the power consumption of the electronic device to a certain extent.

Furthermore, the power supply circuit 14 comprises another voltage regulator 23, which is arranged to generate the second operating voltage $V_{CC2}$. It is obvious that in practical applications it may be necessary to arrange several different operating voltages besides the two operating voltages $V_{CC1}$, $V_{CC2}$ presented in this context.

When the first operating voltage $V_{CC1}$ is set to a substantially new set rating, the first processor MPU can program the phase locked loop 17 into a new frequency. This can be done for example in such a way that the first processor MPU writes a binary value corresponding to the desired frequency into the control register (not shown) of a voltage controlled oscillator 24. Consequently, the frequency of the voltage controlled oscillator 24 changes respectively. This signal generated by the voltage controlled oscillator is conducted to the input $PLL_{in}$ of a phase locked loop, which causes the output frequency of the phase locked loop to change, and the clock frequencies of the processors MPU, DSP change correspondingly. When the phase locked loop 17 is set on the new frequency, the processors MPU, DSP operate at the new clock frequency, wherein it is possible to start up the application.

In another advantageous embodiment of the present invention it is also possible to change the operating voltage for the phase locked loop 17, when the phase locked loop 17 is set on the new frequency. In such an embodiment there is provided at least two adjustable voltage sources.

Table 1 compares the power saving of an electronic device 1 according to a preferred embodiment of the invention in different applications. A device of prior art is designed in view of the most requiring application, being in this table the column representing the video call application. It is assumed that the video call application requires a clock frequency of approximately 150 MHz and an operating voltage of approximately 1.8 V for the processors MPU, DSP. Thus, the power consumption in the device of prior art and in the electronic device according to the invention is substantially equal. in the audio call application, the clock frequency of the processors MPU, DSP is set into approximately 100 MHz, wherein a voltage rating in the order of 1.5–1.3 V is sufficient for the operating voltage. On the basis of Formula 1, the power saving achieved is from 30% to 48%. In a low performance application, the clock frequency of the processors MPU, DSP is set e.g. below 50 MHz and the operating voltage at approximately 1.0 V. Thus, on the basis of Formula 1, a power saving up to 70% can be achieved, which is quite a significant saving.

TABLE 1

|  | Video call | Audio call | Low performance application |
|---|---|---|---|
| Clock frequency of the processor (MHz) | 150 | 100 | <50 |
| Operating voltage (V) | 1.8 | 1.5–1.3 | 1.0 |
| Power saving | — | 30%–48% | 70% |

The performance requirements of the applications used in the electronic device 1 can be determined for example in such a way that the applications are classified into a few performance classes, the classification data being stored in connection with the application, for example in the starting parameters of the application, which is known as such. The program (operating system) starting the application in the electronic device 1 reads this classification data and sets the first operating voltage $V_{CC1}$, as described above in this specification. An example that can be mentioned is an electronic device 1 in which the minimum for the first operating voltage $V_{CC1}$ is 1.0 V, and the maximum 1.8 V. The performance classification comprises for example 9 levels, wherein the adjustment of the operating voltage is made in steps of 0.1 V. If there are applications for which a performance class has not been defined, it is possible to advantageously use a default rating in connection with such an application, for example a class requiring the highest performance, wherein it is secured that the application is functioning sufficiently fast.

Even though in the above-presented embodiment the control of the first operating voltage $V_{CC1}$ was implemented with a control algorithm generated in the application software of the first processor MPU by means of the program commands of the first processor MPU, it is obvious that if necessary, the adjustment can also be implemented in the application software of another processor DSP possibly included in the electronic device. The adjustment can even be implemented with a logic without processing the processors MPU, DSP.

The invention can also be implemented by arranging two or more operating voltages $V_{CC1}$, $V_{CC2}$ to be controlled. The first operating voltage $V_{CC1}$ is used for example as an operating voltage for the processors, and the second and possible other operating voltages are used as operating voltages for other such circuits which make the control of the operating voltage possible but whose operating voltage deviates from the control range of the first operating voltage $V_{CC1}$. This can be applied for example in such systems comprising a number of processors (multiprocessor systems), in which the operating voltages of the different processors can be controlled irrespective of each other, for example in such communication devices in which the first processor MPU and the second processor DSP are on separate circuits. Such an adjustment can also be applied for example in the control of the operating voltages of external memories when the processor is controlled with a low clock frequency. Yet another example that can be mentioned is an application in which the ASIC circuit 2 comprises separate operating voltage lines for the internal processors MPU, DSP, wherein the operating voltages of these processors MPU, DSP are adjusted by different means for generating voltage. Thus, for example during an audio call, the first processor MPU is driven by a low clock frequency (e.g. ca 26 MHz) and by a low operating voltage (e.g. ca 1 V), while at the same time it might be necessary to drive the second processor DSP by a higher clock frequency (e.g. ca 100 MHz) and with a higher operating voltage (e.g. between 1.3 V and 1.5 V). Such operations require implementing level-shifters to be integrated in the ASIC circuit 2, to make the logic levels of the different operating voltages to correspond to each other. This, however, is prior art implemented for instance between the core (processors MPU, DSP) of the ASIC circuit 2 and the interface (I/O).

The present invention is not restricted solely to the embodiment presented above, but it can be modified within the scope of the appended claims.

What is claimed is:

1. A method for adjusting the power consumption of a communication device, in which method at least a first operating voltage ($V_{CC1}$, $V_{CC2}$) is generated for the communication device, the communication device containing at least one processor (MPU, DSP) which is used to execute program commands of one or more applications, the execution rate of at least one processor (MPU, DSP) in the communication device being set with a clock signal (CLK) which is generated by means for generating a clock signal (CLK), and the operating voltage for the means for generating a clock signal (CLK) is provided by a second operating voltage ($V_{CC2}$), wherein a performance requirement is specified for the application, such that at least said first operating voltage ($V_{CC1}$) of the communication device is adjusted on the basis of the performance requirement of one or more applications which are being executed at a time, and that the second operating voltage ($V_{CC2}$) is kept substantially constant during the change of at least the first operating voltage ($V_{CC1}$).

2. The method according to claim 1, wherein said performance requirement is defined as an execution rate for said program commands of said application.

3. The method according to claim 2, wherein at least said first operating voltage ($V_{CC1}$) of the communication device is adjusted from said applications under execution at a given time on the basis of said performance requirement of said application requiring the highest execution rate.

4. The method according to claim 1, wherein said first operating voltage ($V_{CC1}$) is increased when said performance requirement is increased, and, correspondingly, said first operating voltage ($V_{CC1}$) is decreased when said performance requirement is reduced.

5. The method according to claim 1, wherein the frequency of said clock signal (CLK) is increased when increasing said first operating voltage, and, correspondingly, the frequency of said clock signal (CLK) is decreased when decreasing said first operating voltage, and that said second operating voltage ($V_{CC2}$) is kept substantially constant during the change of the frequency of said clock signal (CLK).

6. The method according to claim 5, wherein said means for generating a clock signal (CLK) is a phase locked loop.

7. A communication device which comprises means for generating a first operating voltage ($V_{CC1}$), one or more processors (MPU, DSP) for executing the program commands of applications, means for generating a clock signal (CLK) for the processor, and means for generating a second operating voltage ($V_{CC2}$) for said means for generating a clock signal (CLK), wherein a performance requirement is specified for the applications, that the communication device also comprises means (MPU, DSP) for examining the performance requirement of the application and means (CTRL, 22) for adjusting at least the first operating voltage ($V_{CC1}$), wherein the first operating voltage ($V_{CC1}$) is arranged to be adjusted on the basis of the performance requirement of one or more applications under execution at a given time, and that the second operating voltage ($V_{CC2}$) is arranged to be kept substantially constant during the change of at least the first operating voltage ($V_{CC1}$).

8. The communication device according to claim 7, wherein said performance requirement is arranged to be defined as an execution rate for said program commands of said application.

9. The communication device according to claim 7, wherein said first operating voltage ($V_{CC1}$) of said communication device is arranged to be adjusted from applications under execution on the basis of said performance requirement of said application requiring the highest execution rate.

10. The communication device according to claim 7, wherein said means (CTRL, 22) for adjusting at least said first operating voltage ($V_{CC1}$) comprise means for storing a set rating for said first operating voltage ($V_{CC1}$), means for generating a reference voltage proportional to said set rating, and means for generating at least said first operating voltage ($V_{CC1}$) on the basis of said reference voltage.

11. The communication device according to claim 7, wherein the device comprises at least one application specific integrated circuit whose at least one operating voltage ($V_{CC1}$) is arranged to be adjusted.

12. The communication device according to claim 11, wherein said application specific integrated circuit comprises a core containing at least one said processor (MPU, DSP), and that the operating voltage ($V_{CC1}$) of the core is arranged to be adjusted.

13. The communication device according to claim 11, wherein said application specific programmable integrated circuit comprises at least one said processor (MPU, DSP) in which said first operating voltage ($V_{CC1}$), which is arranged to be adjusted, is set to be used as an operating voltage, and that said communication device also comprises means (MPU) for changing the frequency of said clock signal (CLK) on the basis of the change in said first operating voltage ($V_{CC1}$), and that said second operating voltage ($V_{CC2}$) is arranged to be kept substantially constant during the change of the frequency of said clock signal (CLK).

14. The communication device according to claim 13, wherein said means for generating a clock signal (CLK) is a phase locked loop.

15. The communication device according to claim 7, wherein said device it is a wireless communication device.

16. The communication device according to claim 15 wherein said wireless communication device is a communicator.

17. The communication device according to claim 7, wherein said control of said first operating voltage ($V_{CC1}$), which is arranged to be adjusted, is implemented with a control algorithm generated in the application software of at least one of said processor (MPU, DSP) by means of the program commands of at least one of said processor (MPU, DSP).

* * * * *